United States Patent Office 2,810,818
Patented Oct. 22, 1957

2,810,818

WELDING OF LOW ALLOY STEEL

Gilbert R. Rothschild, Berkeley Heights, and Craig R. Sibley, New Providence, N. J., assignors to Air Reduction Company, Incorporated, New York, N. Y., a corporation of New York No Drawing. Application May 16, 1957, Serial No. 659,474

10 Claims. (Cl. 219—137)

This invention relates to the inert-gas-shielded, electric arc welding of certain low alloy steels, such as armor plate. This application is a continuation-in-part of application Serial No. 444,396 filed July 19, 1954, now abandoned.

Armor weldments, such as welded military tanks, are customarily obtained by using stick electrodes and an electric arc process. In this type of a weld, it is necessary to obtain high yield strength so that the strength of the weld will approximate or match the strength of the armor. It is also necessary, of course, that the armor welds are able to resist the impact of shells, especially at low temperature, so that a tank will not be split open by an oblique hit with obvious consequent hazards. Similar considerations are involved in other armor constructions, such as battleships. After trying and extensively using expensive stainless steel stick electrodes which did not give the desired yield strength in the weld, specially-coated ferritic-type stick electrodes were developed and used. However, it was found that a great amount of care had to be exercised in fabrication and during welding in order to avoid the danger of latent defects in welds which would result in cracking in the welds, especially at low temperatures. Thus, subsequent to World War II, it was necessary to take extreme precautions with the ferritic-type electrodes, such as using shipping cans, in order to prevent, for instance, water from being retained in the electrode coating. Another precaution involved the use of an electrode baking oven at the welding location as a final assurance that undesired moisture was not retained in the coating.

It is the primary object of the instant invention to provide an improved method and means for welding certain low alloy steels, such as armor, by which cheaper, high-strength welding is effected and the above-mentioned cracking problem is avoided.

A recently-developed, low alloy steel, commonly referred to as T-steel, which is a U. S. Steel plate material identified more specifically by T–1, has excellent mechanical properties which are obtained through a critical balance of small amounts of alloying elements (manganese, nickel, chromium, molybdenum and boron) and a quench-and-temper-heat treatment, after hot rolling. The exceptional mechanical properties, namely high yield strength, and low-temperature impact strength, and the relatively low cost are expected to result in widespread use of this T-steel for welded pressure vessels, rolling stock, and the like. It has been conventional practice to weld standard steels with coated stick electrodes or with a flux-submerged arc, neither of which are considered ideal for welded T-steel constructions. The coated electrodes involve problems such as the above-mentioned cracking difficulty. The submerged arc inherently has the problem of providing the flux and poor visibility. It is, of course, highly desirable that the welding of this new T-steel by an improved, faster welding method and means, other than methods involving coated stick electrodes or a flux-submerged arc, be accomplished.

Another object of the instant invention is the provision of an improved method and means for welding low alloy steel, such as the so-called T-steel, without involving the use of coated stick electrodes or a flux-submerged arc.

It is a further object of the instant invention to provide an improved inert-gas-shielded metal arc welding method for certain low alloy steels and an improved wire composition adapted to be used in such method whereby high-mechanical-strength welds which are highly resistant to impact are obtained in the as-welded condition.

After much experimentation and many difficulties, a welding wire composition was discovered which proved eminently suitable for effecting welds with low alloy steels, such as armor plate and T-steel. Preferably, this wire is used in a modified inert-gas-shielded, metal arc method of welding. The wire composition by percent weight analysis is from about .04 to about .08 carbon; from about 1.20 to about 1.50 manganese; from about .30 to about .60 silicon; from about .10 to about .20 vanadium; from about 1.10 to about 1.30 nickel; from about .30 to about .55 molybdenum; .025, maximum, phosphorus; .025, maximum, sulfur; .15, maximum, chromium; .035 maximum, titanium; and the remainder being essentially iron. Residual elements, such as copper, tin and lead should be kept as low as possible, such as less than .20%. The wire has a clean surface, that is, free of drawing compounds and preferably this condition is obtained by cleaning. Before this cleaning, a copper film is preferably put on the surface. The copper film is obtained by means of a copper sulphate bath. The heat from which the wire is made is silicon-killed (deoxidized with silicon) without the use of aluminum, so that a wire which is devoid of residual aluminum due to aluminum deoxidizing results. Aluminum from other sources may be detected but is very small in amount, such as .006%, as hereinafter noted. It is to be noted that the wire contains at least 95% iron.

An example of apparatus suitable for utilizing the instant wire and of the basic method of using the wire is disclosed in Muller et al. Patent No. 2,504,868, issued April 18, 1950, assigned to applicants' assignee. This patent discloses the recently-developed inert-gas-shielded, metal arc welding method which was modified in developing the instant process.

With the above-described wire, it became possible to make improved armor weldments, using the basic steps of the inert-gas-shielded metal arc welding method above mentioned. These weldments met military specifications for armor and hence had high yield strength (exceeding 90,000 pounds per square inch) and high resistance to impact. The resistance to impact resulted, in part, from the fact that the inert-gas-shielded metal arc welding process inherently does not involve water contamination or other factors conducive to cracking since no flux or flux coating is used. Once the problem of discovering a wire composition which will work in the above-mentioned type of welding process and give the desired tensile strength without other adverse effects, the inherent avoidance of flux and water contamination results. It is to be appreciated that innumerable complications were involved in discovering a suitable wire. Among the important factors are the composition of the wire and the material to be welded, the shielding gas, the type of current and/or arc polarity, and the relation of the arc, the alloying elements, the wire and the workpiece. The preferred welding conditions for low alloy steels including armor plate and T-steel include the use of reverse-polarity direct current, a 99% argon–1% oxygen, non-turbulent gas shield and a wire feed of at least 100 inches per minute.

With the instant invention, the advantages of a higher rate of deposition of a weld which can be used as welded without heat treatment and a high yield strength weld which is not subject to cracking in the heat-affected zone of the weld are achieved. It is to be realized that the instant welds are not to be stress relieved after welding since the weld zone would become embrittled. It is to be appreciated that the instant welds at least match the yield strength of the workpieces which the welds join.

In welding one type of armor plate (ordnance armor) the average composition of the instant ferritic wire having the above range of composition was by weight percent, carbon .07; phosphorus .014; sulfur .012; silicon .40; manganese 1.45; nickel 1.15; molybdenum .47; vanadium .17; chromium .12; titanium .034; aluminum .006; and the remainder being essentially iron containing residual traces of other elements.

Typical welding conditions for welding one and one-half inch ordnance armor plate with the instant wire were as follows:

Electrode diameter: 1/16 inch
Gas: 99% argon—1% oxygen at 40 cubic feet per hour
Power: reverse polarity direct current
Current: 305–310 amperes
Arc voltages: 27–30 volts
Travel speed per pass: 9–12 inches per minute
Wire feed rate: 180–250 inches per minute The composition of the plate which was used in the above-described welding operation was, by weight percent analysis, carbon .25; manganese 1.17; silicon .46; phosphorus .013; sulfur .022; chromium .66; nickel .61; molybdenum .33; and the remainder being essentially iron. No zirconium or vanadium was detected. The chemical composition of the weld metal on the same percent basis was, carbon .07; manganese 1.09; silicon .26; sulfur .017; phosphorus .013; chromium .18; nickel 1.15; molybdenum .44; vanadium .16; and the remainder being essentially iron.

The typical mechanical properties for the weld metal was: yield strength 101,000 pounds per square inch, and tensile strength 114,000 pounds per square inch. The impact strength test, as made on a weld-metal Charpy type specimen with an Izod notch, showed resistance to impact at about 55 foot pounds at about −40° F. Military specification (MIL-E-986A Grade 230) was met by the above-described welds.

The compositions of other typical ordnance armor plates are as follows:

| Armor Plate | C | Mn | Si | Cr | Ni | Mo | Zr | B |
|---|---|---|---|---|---|---|---|---|
| A | .27 | .90 | .22 | .95 | .90 | .35 |  | .003 |
| B | .28 | .90 | .70 | .60 | .05 | .17 | .10 | .002 |
| C | .28 | 1.25 | .25 | .80 | .70 | .20 |  | .002 |
| D | .28 | 1.50 | .25 | .04 | .05 | .35 |  | .002 |

The instant wire and methods are suitable for welding the above armor. It is to be noted, in respect to the armor material, that the carbon is less than .30% but more than .15% and that the alloying elements comprise less than 5% but more than 2% and include principally manganese, silicon, chromium, nickel and molybdenum. By noting the composition of T-steel hereinafter, it can be seen that T-steel has a similar composition in respect to most of the alloying elements. The small amount of boron in the above armor steels contributes significantly to the hardenability of these steels.

The above-mentioned T-steel has a composition by percent weight analysis of carbon .18, maximum; manganese .80–1.20; silicon .30–.50; nickel .70–1.00; molybdenum .35–.60; vanadium .03 minimum; copper .20–.40; chromium .35–.60; boron .003; sulfur .035; phosphorus .035; aluminum .07; titanium .006; and the remainder iron. It is to be noted that the principal alloying elements, manganese, silicon, nickel, molybdenum and chromium, in this steel (low carbon less than .30%) constitute less than 5% but more than 2%, as was the case with armor plate.

In welding T-steel, the wire composition was as above-described. The preferred gas shield and current are argon gas with 1% oxygen addition and reverse-polarity direct current, which are the same as the preferred conditions for armor welding.

A typical single V butt-weld joint, as deposited and made with both one inch and one-half inch T-steel plates and the instant wire, had a transverse tensile strength of 120,100 pounds per square inch. The longitudinal yield tensile strength of this joint was 103,000 pounds per square inch. This joint was made with 1/16 inch diameter wire and a 99% argon plus 1% oxygen gas shield. The voltage was about 27 volts and the current was about 360 amperes. The travel speed was about 10 inches per minute. The wire feed was about 180 inches per minute. Charpy keyhole properties of the above joint as welded were 50% chear at about −118° F. and 20 foot pounds at −129° F.

Typical tensile properties of weld metal made in connection with T-steel were yield strength 105,900 pounds per square inch and tensile strength 113,400 pounds per square inch. This weld metal had a percent weight analysis of carbon .07; manganese 1.11; phosphorus 0.17; sulfur .015; silicon .30; nickel 1.19; chromium .11; molybdenum .40; vanadium .09; copper .29; and titanium .008.

Another type of low alloy steels which can best be welded with the novel electrode wire of the present invention used with the inert gas shielded metal arc welding process are the so-called Special Treatment Steels, more commonly known as STS steels, used largely in ship building, particularly in the construction of combat vessels. These steels are also classified as armor and form the basis of Military Specification 47 S 26. Basically STS steel is a low alloy steel having manganese, chromium and nickel as the principal alloying elements. While the military specification for STS steel does not specify a chemical analysis, steels made to conform to the specification have as a rule a percent weight analysis that falls within the following range: carbon .23–.30; manganese .20–.60; silicon .03–.30; chromium .80–1.50; nickel 2.50–4.00; molybdenum .03–.20. A specific sample of STS steel was welded in accordance with the present invention. The welding electrode wire used was 1/16 inch in diameter of the same novel composition as heretofore described. The inert gas shielded metal arc welding process was used. The welding conditions were:

Current: 300 amperes, direct current reverse polarity
Arc voltage: 28 volts
Wire feed: 210 inches per minute
Shielding gas: 40 cubic feet per hour of argon plus 1% oxygen The weld so made fully met the mechanical property requirements of specification MIL-E-986A.

From the foregoing, it is apparent that an improved wire composition and an improved preferred process using such wire have been discovered which are adapted for the welding of certain high strength low alloy steels, such as armor plate and T-steel. These steels and other comparable steels can be defined as low alloy, high strength steels having .15–.30% carbon and 2–5% other alloying elements. The other alloying elements comprise principally manganese, silicon, chromium, nickel and molybdenum, and may include other elements such as boron or vanadium. Such low alloy steels usually contain alloying elements in substantially the following percentages by weight of the total alloy; manganese .20–1.50; silicon .03–.70; chromium .04–1.50; nickel .05–4.00; molybdenum .03–.60. The remainder of the steel is substantially iron, although it may contain small amounts of such elements as copper, tin, lead, boron, titanium and vanadium. The instant wire and process can be used to weld this type of steel.

In the foregoing examples and in the practice of this invention, it is to be understood that the electric welding arc can be described as being rooted to a workpiece and that the workpiece is preferably negative in respect to the electrode, so that the above-mentioned direct current at reverse polarity results. In welding, a clean bare welding wire (one which is not flux coated) is fed to the arc and forms the weld pool which, along with the tip of the wire, is shielded or blanketed by an inert-gas-shield. It is preferred that the instant wire be used as a consuming electrode wire; that is, the arc roots thereon and the electrode is sprayed or transferred to the workpiece and hence consumed. It is also preferred that the inert-gas-shield be 99% argon and 1% oxygen for welding the above-described low alloy steels. The usual end result of the instant invention is a weldment comprised of at least two pieces of the certain low alloy steels which are joined by a ferrous weld deposit derived from the instant wire by the above preferred conditions. It is apparent that the instant invention can be utilized to fill defects and to do overlay work and similar operations. It is also to be understood that, in practice, the instant wire is sold and used as a coil of welding wire adapted to be fed to an electric arc.

The exact explanation of why the instant wire and process produces a weldment which has both high yield strength and a high resistance to impact is not known. However it has been found that the instant ferritic-type electrode does result in welds which have the desired yield strength and which avoid the problem of underbead cracking. Military requirements as to ballistic loading on armor plate have been met. Similar considerations apply to welded T-steel constructions, such as pressure vessels and rolling stock and similar results have been obtained.

It is to be appreciated that greater speed of welding results with the instant wire and process and hence greater overall economy is effected than is possible with stick electrode welding. The use of appreciable amounts of expensive and critical materials, as is required for stainless steel stick electrodes, is avoided. The special precautions required for coated ferritic-type stick electrodes are also avoided.

While the preferred embodiments of the invention have been described, it is to be understood that one skilled in the art can make other embodiments within the scope of the following claims.

We claim:

1. The method of welding a ferrous metal workpiece comprised of, by weight, .15% to .30% carbon; about 2-5% of other alloying elements resulting from the incorporation of about .80% to 1.50% manganese; .22% to .70% silicon; .04% to .95% chromium; .05% to 1.00% nickel; .17% to .60% molybdenum and the remainder being substantially iron; said method comprising establishing a direct current reverse polarity electric arc between said ferrous metal workpiece and consumable ferrous electrode containing, by weight, .04% to .08% carbon; 1.20% to 1.50% manganese; .30% to .60% silicon; 1.10% to 1.30% nickel; .10% to .20% vanadium; and .30% to .55% molybdenum; blanketing said arc, the consuming end of said electrode, and the welding pool formed on said workpiece with a non-turbulent stream of 99% of argon—1% oxygen gas to exclude air from said pool and said consuming end; and advancing said electrode to maintain the arc, as electrode material is transferred from the electrode to said metal, so that a weld having a high yield strength and being resistant to impact is formed.

2. The method of welding low allow steels containing, by weight, about .15% to .30% carbon and about .80% to 1.50% manganese; .22% to .70% silicon; .04% to .95% chromium; .05% to 1.00% nickel; .17% to .60% molybdenum, with the total of said elements being between 2-5%, said method comprising rooting an electric welding arc to a workpiece of said steel and feeding a bare welding wire to said arc, said welding wire being a ferrous alloy containing, by weight, .04% to .08% carbon; 1.20% to 1.50% manganese; .30% to .60% silicon; .10% to .20% vanadium; 1.10% to 1.30% nickel, and .30% to .55% molybdenum.

3. The method of welding a low alloy steel containing, by weight, about .15% to .30% maximum, carbon; .80% to 1.20% manganese; .30% to .50% silicon; .35% to .60% chromium; .70% to 1.00% nickel; .35% to .60% molybdenum, said method comprising rooting an electric welding arc to a workpiece of said steel and feeding a bare welding wire to said arc, said welding wire being a ferrous alloy containing, by weight, .04% to .08% carbon; 1.20% to 1.50% manganese; .30% to 60% silicon; .10% to .20% vanadium; 1.10% to 1.30% nickel; and .30% to .55% molybdenum.

4. The method of welding armor plate having compositions, by weight, of .25% to .28% carbon; .90% to 1.50% manganese; .22% to .70% silicon; .04% to .95% chromium; .05% to .90% nickel; .17% to .35% molybdenum, with the total of said elements being between about 2–5%, said method comprising rooting an electric welding arc to a workpiece of armor plate having said composition and feeding a bare welding wire to said arc, said welding wire being a ferrous alloy containing, by weight, .04% to .08% carbon; 1.20% to 1.50% manganese; .30% to .60% silicon; .10% to .20% vanadium; 1.10% to 1.30% nickel; and .30% to .55% molybdenum.

5. The method according to claim 4 and being further characterized in that the armor plate contains from .002% to .003% boron.

6. A ferritic-type weld wire for welding low alloy steels containing, by weight, about .15% to .30% carbon; and about .80% to 1.50% manganese; .22% to .70% silicon; .04% to .95% chromium; .05% to 1.00% nickel; and .17% to .60% molybdenum, with the total of said elements being between 2.00% to 5.00%; said wire being fed to an electric arc which is shielded from the atmosphere by an inert gas, said wire containing by percentage weight analysis, carbon .04% to .08%; manganese 1.20% to 1.50%; silicon .30% to .60%; nickel 1.10% to 1.30%; vanadium .10% to .20%; molybdenum .30% to .55%; and the remainder being essentially iron.

7. A ferritic-type welding wire for gas shielded arc welding of high strength low alloy steel, said wire containing by weight of the total alloy from about .04% to about .08% carbon; from about 1.20% to about 1.50% manganese; from about .30% to about .60% silicon; from about 1.10% to about 1.30% nickel; from about .10% to about .20% vanadium; from about .30% to about .55% molybdenum, and the remainder substantially all iron.

8. A ferritic-type welding wire for gas shielded arc welding high strength low alloy steels containing by weight, about .15% to .30% carbon and from 2% to 5% of alloying elements comprising principally manganese, silicon, chromium, nickel, and molybdenum, said wire containing by weight of the total alloy from about .04% to about .08% carbon, from about 1.20% to about 1.50% manganese, from about .30% to about .60% silicon, from about 1.10% to about 1.30% nickel, from about .10% to about .20% vanadium, from about .30% to about .55% molybdenum, and the remainder substantially all iron.

9. A ferritic-type welding wire for gas shielded arc welding high strength low alloy steels containing by weight about .15% to .30% carbon, and about .20% to 1.50% manganese, .03% to .70% silicon, .04% to 1.50% chromium, .05% to 4.00% nickel, and .03% to .60% molybdenum, with the total of said alloying elements being between 2.00% and 5.00%; said wire containing by percentage weight analysis, carbon .04% to .08%, manganese 1.20% to 1.50%, silicon .30% to .60%, nickel 1.10% to 1.30%, vanadium .10% to .20%, molybdenum .30% to .55%, and the remainder being essentially iron.

10. The method of welding low alloy steels containing by weight about .15% to .30% carbon and about .20% to 1.50% manganese, .03% to .70% silicon, .04% to 1.50% chromium, .05% to 4.00% nickel, .03% to .60% molybdenum, with the total of said alloying elements being between 2% and 5%, said method comprising rooting an electric welding arc to a workpiece of said steel and feeding a bare welding wire to said arc, said welding wire being a ferrous alloy containing by weight .04% to .08% carbon, 1.20% to 1.50% manganese, .30% to .60% silicon, .10% to .20% vanadium, 1.10% to 1.30% nickel, and .30% to .55% molybdenum.

References Cited in the file of this patent
UNITED STATES PATENTS

| | | |
|---|---|---|
| 2,022,307 | Austin | Nov. 26, 1935 |
| 2,040,189 | Strauss | May 12, 1936 |
| 2,253,812 | Rooke | Aug. 26, 1941 |